United States Patent
Jones et al.

(10) Patent No.: US 8,522,671 B2
(45) Date of Patent: Sep. 3, 2013

(54) RACKING SYSTEM FOR DEEP FRYER

(75) Inventors: Douglas S. Jones, New Port Richey, FL (US); Henry Preston Hutson, Bossier City, LA (US)

(73) Assignee: Frymaster L.L.C., Shreveport, LA (US)

( * ) Notice: Subject to any disclaimer, the term of this patent is extended or adjusted under 35 U.S.C. 154(b) by 515 days.

(21) Appl. No.: 12/709,004

(22) Filed: Feb. 19, 2010

(65) Prior Publication Data
US 2010/0212511 A1     Aug. 26, 2010

Related U.S. Application Data

(60) Provisional application No. 61/208,103, filed on Feb. 20, 2009.

(51) Int. Cl.
*A47J 36/00* (2006.01)
*A47J 37/12* (2006.01)

(52) U.S. Cl.
USPC ........... 99/330; 99/336; 99/355; 99/403; 99/404; 99/407; 99/410; 99/448; 99/450

(58) Field of Classification Search
USPC ............. 99/404, 407, 410–415, 448, 450, 99/336, 403, 330, 355
See application file for complete search history.

(56) References Cited

U.S. PATENT DOCUMENTS

| | | | |
|---|---|---|---|
| 1,977,454 A | 10/1934 | Price | ............... 161/16 |
| 3,061,279 A | 10/1962 | Reed | |
| 3,187,664 A | 6/1965 | Jennings | |
| 3,501,316 A | 3/1970 | Guthrie, Sr. | |
| 3,563,158 A | 2/1971 | Omer | ............... 99/326 |
| 3,608,472 A | 9/1971 | Pelster et al. | |
| 3,635,722 A | 1/1972 | Moore | |
| 3,690,246 A | 9/1972 | Guthrie, Sr. | |
| 3,821,925 A | 7/1974 | Moore | |
| 4,560,074 A | 12/1985 | Manning | |
| 4,593,170 A | 6/1986 | Maeda et al. | |
| 4,650,970 A | 3/1987 | Ohouchi | |
| 4,732,081 A | 3/1988 | Sakuma | |
| 4,785,725 A | 11/1988 | Tate et al. | |
| 4,814,570 A | 3/1989 | Takizaki | |
| 4,852,471 A | 8/1989 | Lansing | |
| 4,898,091 A | 2/1990 | Rozak et al. | |
| 4,930,408 A | 6/1990 | King et al. | |
| 4,951,558 A | 8/1990 | Figliuzzi | ............... 99/336 |
| 4,997,101 A | 3/1991 | King et al. | |
| 5,019,412 A | 5/1991 | Hattori | |
| 5,073,391 A | 12/1991 | DeMars et al. | |
| 5,097,752 A | 3/1992 | Kung | |
| 5,142,968 A | 9/1992 | Caron et al. | |

(Continued)

OTHER PUBLICATIONS

International Search Report dated Sep. 2, 2010 from corresponding PCT/US2010/042164.

(Continued)

*Primary Examiner* — Sebastiano Passaniti
(74) *Attorney, Agent, or Firm* — Ohlandt, Greeley, Ruggiero & Perle, L.L.P.

(57) ABSTRACT

A system for a deep fryer having a frypot containing a cooking Medium including a holder that carries a food product to be cooked in the cooking medium and a motor operatively connected to the holder that lowers the holder into the cooking medium. The system further includes a sensor that detects contact of the holder when the holder is immersed in the cooking medium; and a controller including a timer that commences cooking the food product when the sensor contacts holder.

25 Claims, 3 Drawing Sheets

(56) References Cited

U.S. PATENT DOCUMENTS

| | | | |
|---|---|---|---|
| 5,165,329 A | 11/1992 | Jacob et al. | 99/336 |
| 5,195,569 A | 3/1993 | Peterson et al. | |
| 5,263,406 A | 11/1993 | Chiu | |
| 5,379,684 A | 1/1995 | Ettridge | 99/336 |
| 5,398,597 A | 3/1995 | Jones et al. | 99/330 |
| 5,402,712 A | 4/1995 | King et al. | 99/407 |
| 5,469,778 A | 11/1995 | Prudhomme | 99/336 |
| 5,483,872 A | 1/1996 | Nield | |
| 5,486,685 A | 1/1996 | Dodds | |
| 5,528,982 A | 6/1996 | Chaung | |
| 5,771,781 A | 6/1998 | Sham | |
| 5,809,870 A | 9/1998 | Baillieul | 99/330 |
| 5,881,632 A | 3/1999 | Fadoul | |
| 5,974,955 A | 11/1999 | King et al. | |
| 6,009,795 A | 1/2000 | Werts | 99/336 |
| 6,022,572 A | 2/2000 | Winter et al. | 426/231 |
| 6,085,640 A | 7/2000 | King | 99/407 |
| 6,112,646 A | 9/2000 | King et al. | 99/336 |
| 6,168,665 B1 | 1/2001 | Sakai et al. | |
| 6,274,847 B1 | 8/2001 | Hlava et al. | 219/433 |
| 6,305,270 B1 | 10/2001 | Wang | 99/336 |
| 6,322,831 B1 | 11/2001 | Mote et al. | 426/231 |
| 6,336,395 B1 | 1/2002 | Tiszai | 99/407 |
| 6,588,325 B1 | 7/2003 | Savage | 99/407 |
| 6,626,088 B2 | 9/2003 | Ono | |
| 7,105,780 B2 | 9/2006 | De'Longhi | 219/436 |
| 7,484,455 B2 | 2/2009 | De'Longhi | 99/330 |
| 2009/0044706 A1 | 2/2009 | Foster et al. | 99/336 |

OTHER PUBLICATIONS

International Preliminary Report of Patentability mailed Apr. 1, 2011 in the corresponding PCT/US2010/024759 ("Additional Citations").

International Search Report dated Apr. 23, 2010 in the corresponding PCT/US2010/024759.

Office Action Dated Oct. 10, 2012, in related U.S. Appl. No. 12/837,317.Total pages (19).

RACKING SYSTEM FOR DEEP FRYER

CROSS-REFERENCE TO RELATED APPLICATION

This application claims the benefit of U.S. Provisional Application No. 61/208,103 filed on Feb. 20, 2009, which is incorporated by reference herein.

BACKGROUND OF THE INVENTION

1. Field of the Invention

This disclosure relates to a racking system for deep fryers for the food service industry. More particularly, this disclosure relates to a racking system that permits a food to be safely lowered into cooking oil and automatically removed from the cooking oil based upon preprogrammed temperatures and cooking times.

2. Description of Related Art

A commercial deep fat fryer typically has multiple fryer pots that hold melted shortening or oil that is heated by heated tubes or gas fired burners. When the oil is at a proper temperature an operator must lower a large quantity of food into the tank until it is cooked and then retrieve it. Foods typically cooked in a commercial situation with a deep fryer include battered coated chicken, fish and non-battered coated items such a French fries. In a commercial situation it is desirable to cook large quantities of such foods, but the problem of lowering the food into the frypot, and retrieving the cooked food should only require a minimum involvement of an operator. Most importantly, substantial operator exertion and cooking discretion should not be required for customer and operator safety.

Currently, racking systems for frying in deep fryers that are manually lifted and controlled are commercially available. Such systems use different motors and mechanical lifts to move fryer baskets or rack systems into cooking oil. Other systems use cables, guide rails and motorized pulley systems to raise and lower the food for cooking.

With all such systems, reliability and safety are concerns. Racking systems must be able to lower the food to be cooked into the cooking oil at the proper cooking temperature. Food that is undercooked presents health concerns and food that is overcooked is unsatisfactory for the consumer. Further, the large volume of cooking oil and the large amount of food to be cooked can present a safety concern for the operator.

Accordingly, there is a need for a racking system that has a controller that is communicates with racking system components to automatically lower plurality of racks holding the food product into the cooking oil when a pre-set range of temperatures has been reached and starts a cooking timer once the rack is submerged in the oil and then raises rack after a cooking cycle has ended.

SUMMARY OF THE INVENTION

The present disclosure provides for a deep fryer having a racking system and a controller that automatically lowers the racking system based upon the temperature of the cooking oil and holds the rack at such depth until the cooking cycle is completed and automatically enables lifting the rack from the cooking oil after a preset length of time.

The present disclosure also provides for a racking system having a controller that prevents a cook cycle from being started unless the oil in the deep fryer is in a preset temperature range near a setpoint temperature.

The present disclosure further provides for a racking system having a controller that senses that cooking oil has reached a temperature set point in a preset temperature range, and then sends a signal to enable plurality of racks to be lowered into cooking oil.

The present disclosure still further provides for a racking system for a fryer pot having a controller that receives a signal from a contact sensor disposed in the fryer pot that racking system has contacted such sensor and has thus reached a desired depth in frypot, thereby initiating a timer for cooking.

The present disclosure still yet further provides for a racking system having a controller that permits racking system to lower into cooking oil when a preset temperature has been reached, pause for a preset length of time and automatically raise racking system to thereby quench racks.

The present disclosure provides for a deep fryer having a racking system that requires that the operator press two buttons with separate hands to lower plurality of racks into the fryer for added safety after a proper oil cooking temperature has been sensed.

A system for a deep fryer having a frypot containing a cooking medium including a holder that carries a food product to be cooked in the cooking medium and a motor operatively connected to the holder that lowers the holder into the cooking medium. The system further includes a sensor that detects contact of the holder when the holder is immersed in the cooking medium; and a controller including a timer that commences cooking the food product when the sensor contacts holder.

A system for a deep fryer having a frypot containing a cooking medium that includes a plurality of racks that hold a food product; a motor operatively connected to the plurality of racks and a sensor that senses a temperature of said cooking medium. The system further includes a contact sensor; and a controller that sends a signal to the motor based on a sensed temperature to lower the food product into the cooking medium and commences a timer for cooking the food product based on a signal received from a sensor that plurality of racks has contacted the contact sensor.

A method of operating a racking system of a deep fryer having a plurality of racks that carry food product to be cooked in a cooking medium of a frypot including receiving a signal that a product to be cooked has been selected and lowering the plurality of racks into the cooking medium based upon a parameter of the selected product. The method includes commencing a cook timer for the food product based on a signal that the food product has been submerged in the cooking medium.

BRIEF DESCRIPTION OF THE DRAWINGS

The foregoing and still other objects and advantages of the present invention will be more apparent from the following detailed explanation of the preferred embodiments of the invention in connection with the accompanying drawings.

DETAILED DESCRIPTION OF THE DISCLOSURE

Figure 1:
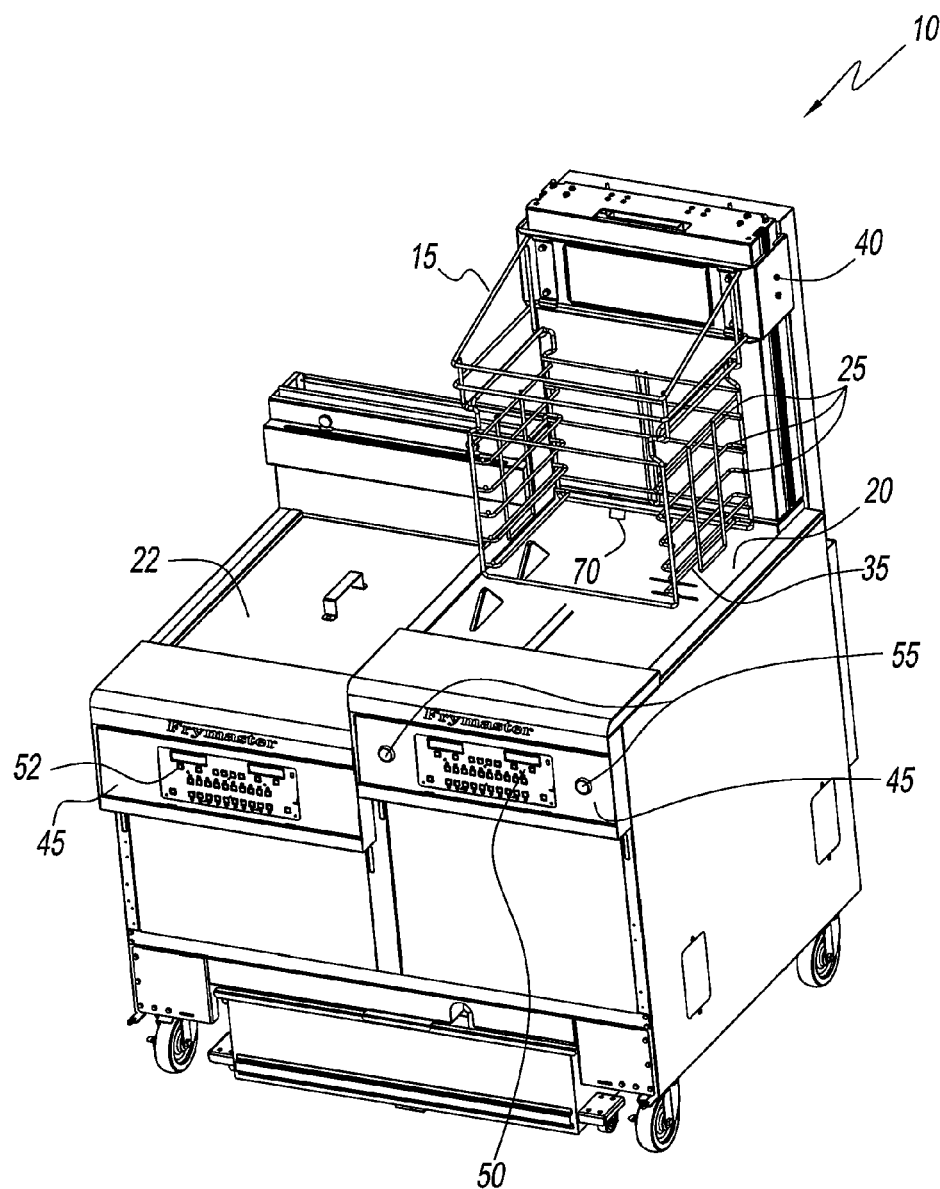
FIG. 1 illustrates a front perspective view of the deep fryer incorporating a racking system for a frypot of the deep fryer, according to the present disclosure.

FIG. 1 shows a deep fryer according to the present invention, generally referenced by reference numeral 10. Deep fryer 10 has a housing 5 and a racking system 15. Deep fryer 10 has fryer pots 20 and 22. Racking system 15 has a holder such as a plurality of racks 25. Plurality of racks 25 are capable of carrying a food product, such as for example, a chicken, for cooking in oil fryer pot contained in housing 5. Each rack 35 of plurality of racks 25 can carry the weight of more than one chicken, for example, so that at least six chickens may be cooked at a single time. Each rack 35 is supported by rack support 40. Plurality of racks 25 and rack support 40 are disposed over fryer pot 22. Fryer pots 20 and 22 can be of several sizes that may accommodate from 55 pounds to 150 pounds of cooking medium such as oil or shortening.

Fryer pots 20 and 22 each has a front panel 45 having a controller 50 and 52, respectively. Fryer pot 20 and 20 have similar functionality, however, only fryer pot 20 will only be discussed in the present disclosure for the purpose of simplicity. Front panel 45 has a pair of control switches 55 disposed on opposite sides thereof. By having switches 55 disposed on opposite sides of control panel 45, operator is forced to use two hands to activate racking system 15. Front panel 45 contains a data input surface or keypad to permit an operator to preset controller 50. Racking system 15 is controlled by controller 50. Controller 50 has a data storage device for storing information such as food type, cooking temperatures and cooking times for cook cycles that are selectable by an operator.

Figure 2:
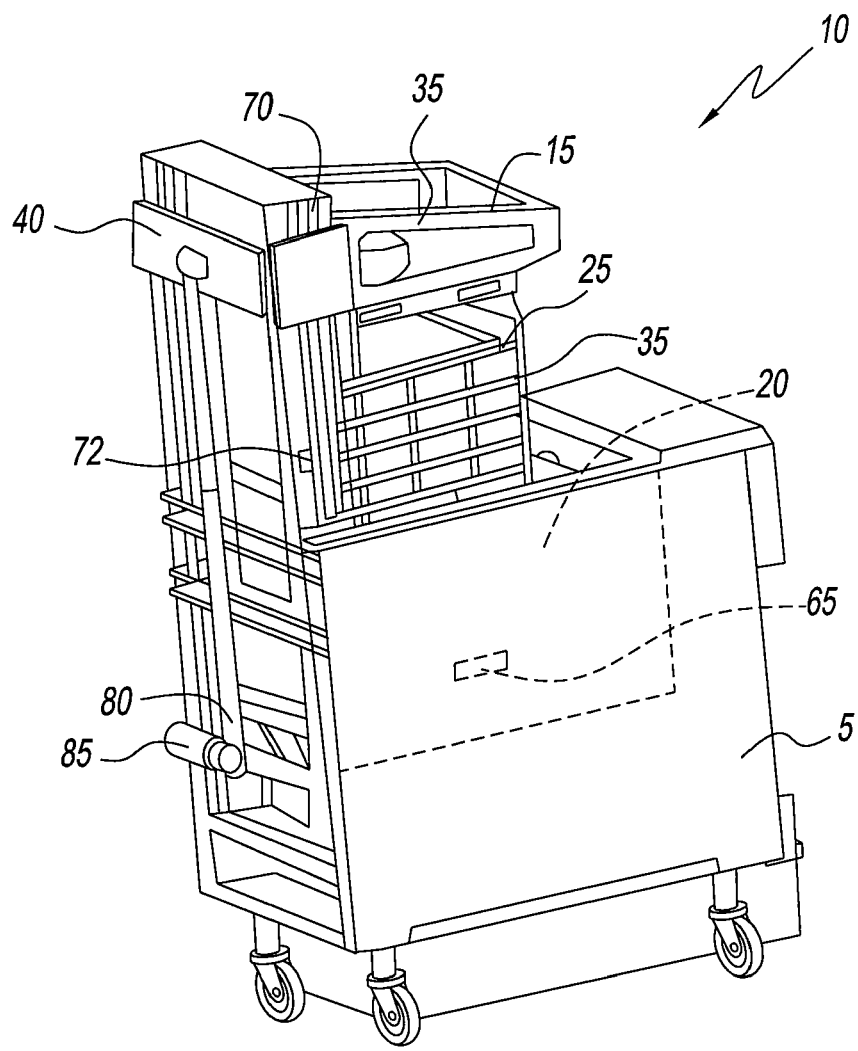
FIG. 2 illustrates a rear perspective view of the deep fryer showing racking system of FIG. 1, according to the present disclosure.

Referring to FIG. 2, fryer pot 20 has a temperature sensor 65 is disposed at a lower surface thereof to provide an indication of temperature of cooking medium. Temperature sensor 65 is operatively associate with controller 50 and to provide temperature updates of cooking medium. Temperature sensor 65 is disposed in a region of fryer pot 30 that coincides with the position of plurality of racks 25 when they are submerged in cooking oil so that an accurate oil temperature is sensed by sensor 65.

Deep fryer 10 shows rack support 40 that is supported on track 70. Track 70 is connected to top of housing 5 and centrally disposed on deep fryer 10 for stability. Rack support 40 is moved along track 70 in the vertical direction by a motor 80 and a linear actuator 85. Motor 80 drives linear actuator 85 to provide motive force to raise and lower rack support 40 and plurality of racks 25. Motor 80 receives signals from controller 50 to either elevate or lower plurality of racks 25.

Fryer 20 pot also has a sensor 72 disposed on track 70. Sensor 72, preferably a switch, is contacted by plurality of racks 25 when they are submerged in fryer pot 20. Sensor 72 is operably associated with controller 50 to is send a signal to controller 50 when plurality of racks 25 contact sensor 72 to initiate timer for cooking. Accordingly, when sensor 72 is contacted, a timer for cook cycle begins to count.

Controller 50 is connected to front panel 45. Controller 50 includes a processor, a timer device, and a data storage means such as an electromagnetic storage device or chip for storing names and food product information or parameters, such as cooking temperatures, cooking times or cooking cycles for a plurality of food products. Each food product has a cook time and a set point temperature for the cooking medium that is specific to the food product. When an operator uses front panel 45 to enter a product identity such information is provided to processor. Cooking parameters for each food product are preferably stored in the storage device and retrieved in response to information input using front panel 45. When plurality of racks 25 contact sensor 72, a signal is sent to controller 50 to activate a cooking timer. Were cooking time started when plurality of racks 25 lower, the cooking time for the food would be shortened, possibly resulting in undercooked food.

Figure 3:
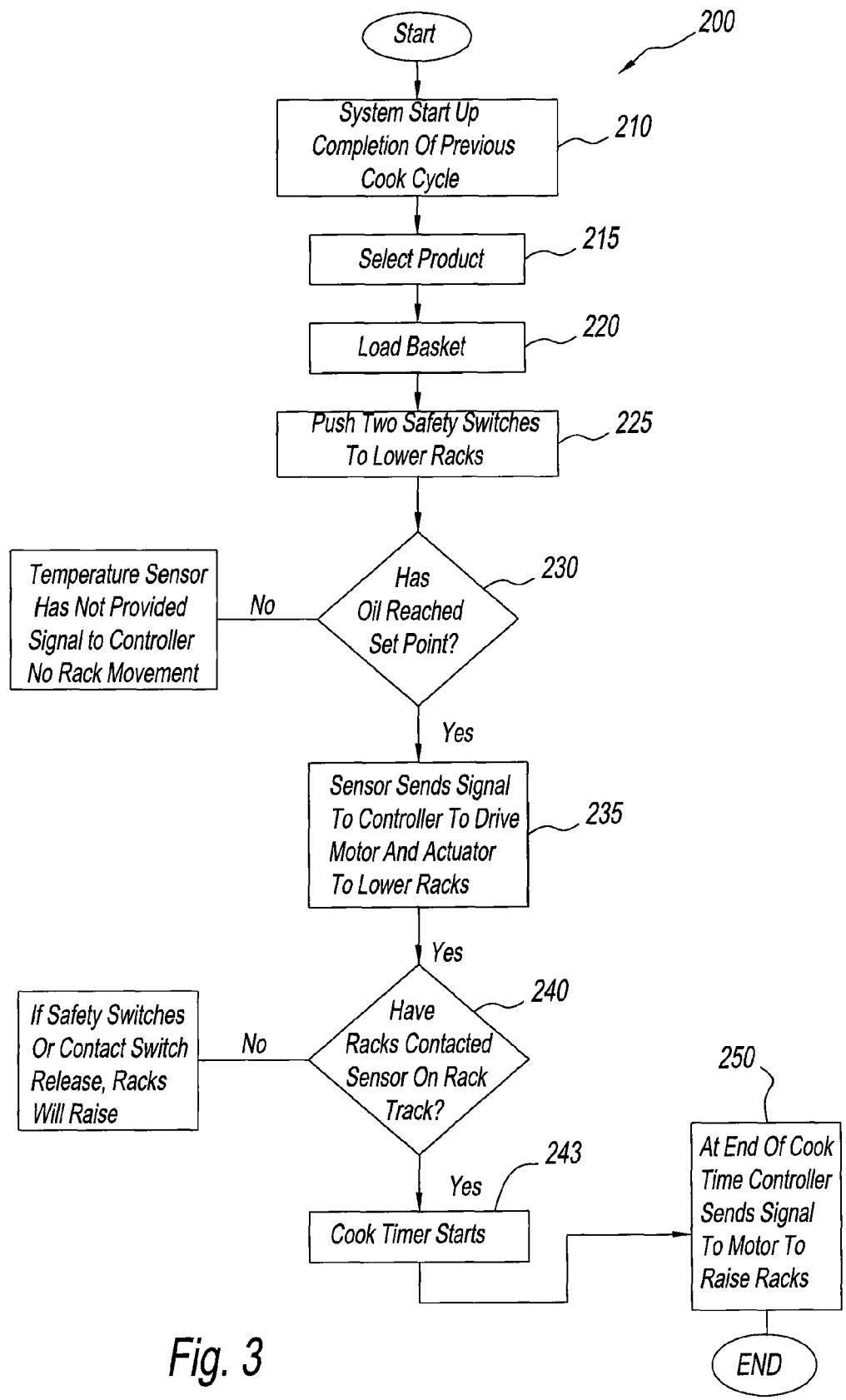
FIG. 3 illustrates flowchart describing a methodology of raising and lowering a racking system according to the present disclosure.

The operation of deep fryer 10 will be described below with reference to flowchart 200 of FIG. 3. At step 210, prior to a commencing a new cook cycle, racking system 15, must be turned on or the previous cooking cycle must be completed. At step 215, operator selects product to be cooked using control panel 45. By selecting the product to be cooked, a temperature set point for the temperature for cooking medium is automatically established because each food product has a pre-programmed cooking temperature set point. Controller 50 retrieves entered information. Temperature range includes a particular preset set point temperature that is within temperature range. Controller 50 sends signals to ignition system or heating elements to heat cooking oil to temperature set point. Controller 50 receives constant oil temperature updates from temperature sensor 65 indicative cooking oil temperature in fryer pot 20. Also by selecting a product to be cooked a cook time is automatically established because each food product has a cook time associated therewith. At step 220, operator loads is plurality of racks 25 with food product. At step 225, operator simultaneously depresses safety buttons 55 to commence lowering of basket. Operator is forced to use two hands to activate rack system 15 because buttons are on opposite sides of panel. At step 230, controller 50 receives signals from sensor 65 of oil temperature. If temperature has not reached setpoint, plurality of racks do not move. If temperature has reached setpoint, controller 50 sends signal to motor 80 to drive actuator 85 to lower plurality of racks 25 in step 235. At step 240, if plurality of racks 25 has contacted sensor 72, a cook timer for food product starts counting automatically in step 245. Once sensor 72 is contacted, food product is completely submerged, and any undercooking of food will be prevented. Further, the quality of food product will be maintained. If either safety switches 55 have been or sensor 72 is released, racks will raise. In step 250, once cook timer has completed the cook time, controller 50 sends signal to motor 85 to drive actuator 80 and lift plurality of rack 25 from fryer pot 30.

Additionally, controller 50 permits a quenching function for racking system 15 that submerges plurality of racks 25 in cooking oil for a preset period of time to prevent food product from sticking to plurality of racks 25. An operator selects quenching function from front panel 45. Controller 50 must receive a signal from temperature sensor 65 that cooking oil is in preset temperature range for quenching function to commence. Controller 50 then sends signal to motor 85 to drive actuator and submerge plurality of racks or individual racks 25. When plurality of racks 25 contact sensor 72 indicating that racks are submerged, the quenching timer will commence. Plurality of racks 25 are submerged for a preset time, such as for example, approximately five seconds and such racks are raised from cooking oil. Plurality of racks 25 are quenched or submerged to prevent food from sticking.

The present disclosure has been described with particular reference to the preferred embodiment. It should be understood that the foregoing descriptions and examples are only illustrative of the present disclosure. Various alternatives and modifications thereof can be devised by those skilled in the art without departing from the spirit and scope of the present disclosure. Accordingly, the present invention is intended to embrace all such alternatives, modifications, and variations that fall within the scope of the present disclosure.

We claim:

1. A system for a deep fryer having a frypot containing a cooking medium, the system comprising:
    a holder that carries a food product to be cooked in the cooking medium;

a motor operatively connected to said holder that lowers said holder into the cooking medium;

a sensor that detects contact of said holder when said holder is immersed in the cooking medium; and a controller that, based on said detected contact, commences a cook timer for a cook cycle to cook a food product disposed on said holder and commences a quench timer for a quench function to prevent the food product from sticking to said holder.

2. The system according to claim 1, further comprising a temperature sensor that sends a signal to said controller when said cooking medium is within a range of temperatures including a preset temperature.

3. The system according to claim 2, wherein said controller sends a signal to said motor to lower said holder when said temperature sensor senses a temperature of cooking oil that is within said range of temperatures.

4. The system of claim 2, wherein said controller sends a signal to said motor to raise said holder after said preset time.

5. The system according to claim 1, wherein said sensor comprises a contact switch.

6. The system according to claim 1, wherein said controller further comprises a storage device that stores food product names and food product parameters.

7. The system according to claim 6, wherein said food product parameters comprise a preset cook temperature and a preset cook time for a food product.

8. The system according to claim 1, further comprising a front panel having a data input surface to select a food product name.

9. The system according to claim 1, further comprising an actuator that is operatively connected to said motor, wherein rotation of said motor drives said actuator to lower said holder.

10. The system of claim 1, wherein said holder comprises a plurality of racks.

11. A system for a deep fryer having a frypot containing a cooking medium, the system comprising:

a plurality of racks;

a motor operatively connected to said plurality of racks;

a temperature sensor that senses a temperature of said cooking medium;

a contact sensor; and a controller that sends a signal to said motor based on a sensed temperature of said temperature sensor to lower said racks into the cooking medium and based on contact of said racks with said contact sensor commences a cook timer for a cook cycle to cook a food product disposed on said racks and commences a quench timer for a quench function to prevent the food product from sticking to said plurality of racks.

12. The system of claim 11, wherein said sensed temperature is within a range of temperatures that includes a preset temperature.

13. The system of claim 11, wherein said contact sensor is a switch that sends a signal to said controller that said plurality of racks has contacted said switch.

14. The system of claim 11, further comprising a track that supports said plurality of racks, wherein said contact sensor is disposed on said track.

15. The system of claim 11, wherein said motor is connected to an actuator, wherein said motor receives a signal from said controller to drive said actuator to lower said plurality of racks.

16. The system of claim 11, wherein said controller further comprises a processor and a storage medium that stores food product information.

17. The system of claim 16, wherein said food product information comprises a plurality of food product names a preset temperatures and a preset cook time associated with each food product name.

18. The system of claim 17, further comprising a front panel wherein a user selects a food product name from said front panel, thereby automatically identifying a preset cook temperature and a preset cook time for said food product.

19. The system of claim 18, wherein said controller sends a signal to said motor to raise said plurality of racks from said cooking medium after said preset cook time elapses.

20. A method of operating a racking system of a deep fryer having a plurality of racks that carry food product to be cooked in a cooking medium of a frypot, the method comprising:

a) receiving a signal that a product to be cooked has been selected;

b) lowering the plurality of racks into the cooking medium to perform a quenching function to prevent said food product from sticking to said plurality of racks;

c) lowering the plurality of racks carrying said food product into the cooking medium based upon a parameter of the selected product; and d) commencing a cook timer for the food product based on a signal that the food product has been lowered in the cooking medium.

21. The method of claim 20, further comprising before step c) simultaneously depressing two safety switches on a front panel of the deep fryer.

22. The method of claim 20, wherin a parameter of the selected product comprises a preset temperature that is within a range of temperatures.

23. The method of claim 20, wherein step c) further comprising sending a signal to activate a motor that drives an actuator to lower the plurality of racks.

24. The method of claim 20, wherein step d) further comprises receiving a signal that the plurality of racks has contacted a sensor at a bottom of the fryer pot, wherein such sensor sends a signal to a controller to commence a cook timer for a preset time.

25. The method of claim 24, further comprising sending a signal to the motor to raising the plurality of racks after said preset time has elapsed.

* * * * *